Nov. 15, 1955  L. NELSON, JR  2,723,484
PACKAGING AND DISPLAY CONTAINERS FOR FISH LURES
Filed Sept. 27, 1951  2 Sheets-Sheet 1
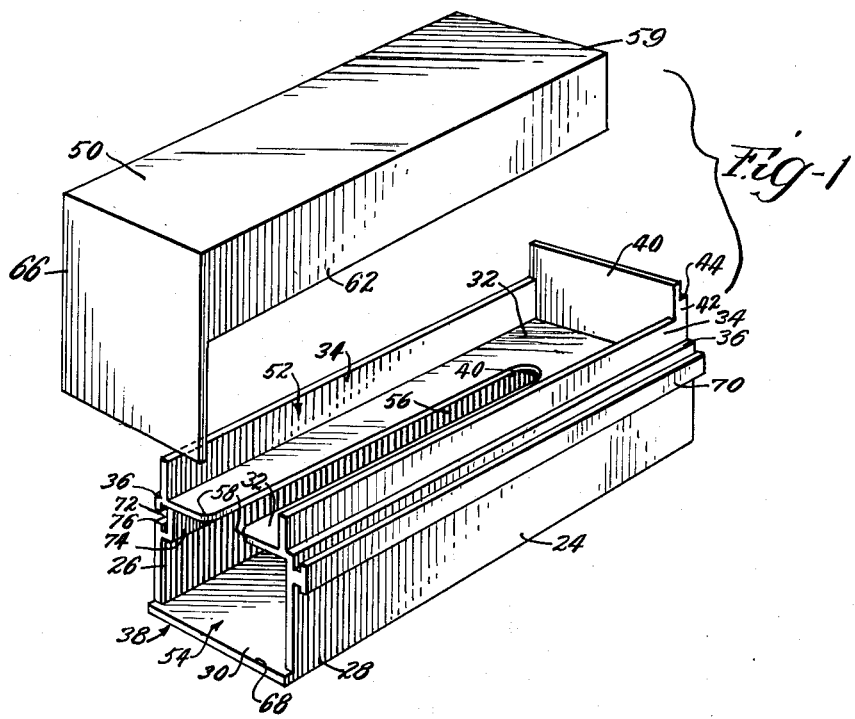
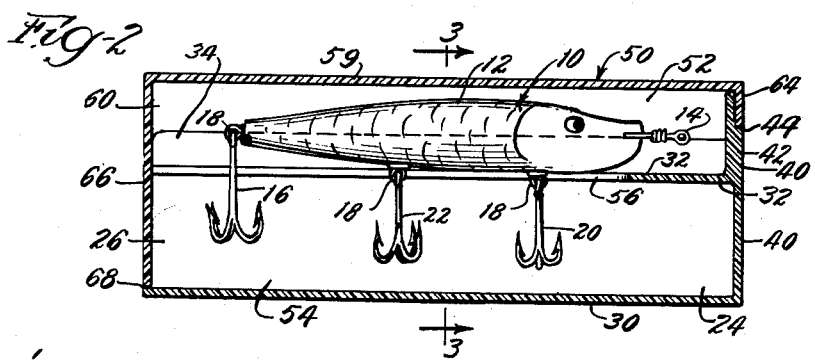
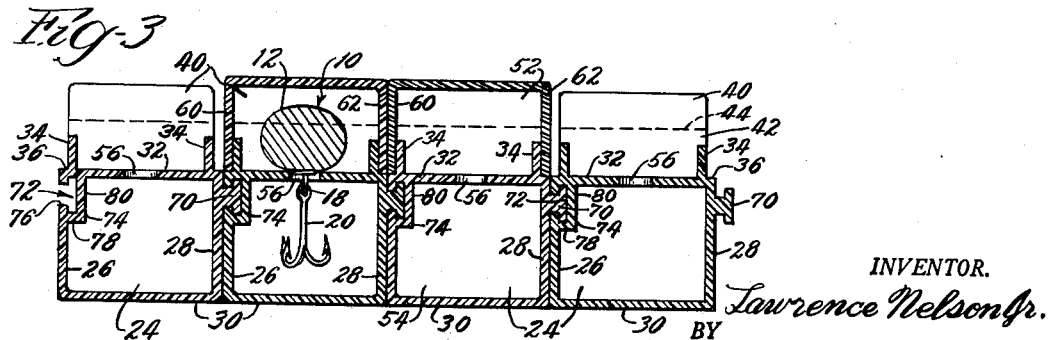
INVENTOR.
Lawrence Nelson Jr.
BY
Mann, Brown & Hansmann
Attys.

Nov. 15, 1955  L. NELSON, JR  2,723,484
PACKAGING AND DISPLAY CONTAINERS FOR FISH LURES
Filed Sept. 27, 1951  2 Sheets-Sheet 2

INVENTOR.
Lawrence Nelson Jr.
BY
Mann, Brown & Hansmann
Attys.

United States Patent Office 2,723,484
Patented Nov. 15, 1955

2,723,484

PACKAGING AND DISPLAY CONTAINERS FOR FISH LURES

Lawrence Nelson, Jr., Chicago, Ill.

Application September 27, 1951, Serial No. 248,601

3 Claims. (Cl. 43—54.5)

The present invention relates to packaging and display containers for lures or artificial bait of the type used by fishermen and which ordinarily consist of a wooden or other body painted to simulate live bait, or made wholly, or in part, of a bright metal or other substance calculated to attract fish by the glittering reflection of light. Such lures invariably have associated therewith one or more fishhooks which are usually of the three-pronged variety and which are flexibly suspended by means of eyelets at spaced points along the length of the lure body.

Present day methods of marketing fish lures of this general type differ widely, and the containers in which they are packaged, displayed and offered for sale are varied in their character. The less expensive lures, costing but a few cents each, are usually displayed in open bins in mixed lots where the different lures are assembled together in loose bulk fashion. Under such circumstances it is inevitable that the hooks of adjacent or proximate lures will become tangled with one another so that separation of a selected lure from the mass of lures becomes difficult. Furthermore, the constant rummaging among the various tangled lures causes the lure bodies to become gouged by the hooks or otherwise marred, to say nothing of the constant danger of injury to the hands or fingers. Even more important from the point of view of lure sales, is the fact that many of the thus assembled lures will remain concealed from the prospective purchaser so that a particularly attractive or pleasing lure, which might otherwise initiate a sale, is completely overlooked.

Lures of a slightly better grade are usually displayed on cards, two or more such lures being secured to the card by means of staples or other fastening means. Such lures, being in the open, accumulate dust or other deposits and soon lose their eye appeal. Furthermore, it is difficult to remove these lures from the cards on which they are mounted and, once removed for inspection purposes, the matter of their replacement on the card is too troublesome to warrant the attempt and such lures are often mislaid or placed with the lures of inferior quality in the open bins.

Higher grade lures are frequently mounted on individual cards by stapling or the like and enclosed, together with the card, in an individual box where the lure is completely concealed from view. Sometimes a picture of the thus packaged lure is printed on the outside of the container, but such two-dimensional displays are never as convincing or effective as a display of the article itself.

The present invention is designed to overcome the above-noted limitations that are attendant upon the packaging and display of fish lures and toward this end, according to one embodiment thereof, it contemplates the provision of an improved container construction designed for use in the packaging of an individual fish lure and which during shipping will prevent self-gouging of the lure body by the hooks associated therewith, as well as centering the lure body in the container away from the walls thereof, and which is also capable of presenting an effective display of the lure when set up for display purposes.

The provision of improved fish lure containers of this character being the principal object of the invention, another object thereof is to provide a container which, when displaying the lure, presents an adequate three-dimensional view of the lure while at the same time rendering the lure readily accessible for removal from the display container for purposes of closer inspection, while at the same time presenting the lure to the grasp in such a manner that the pendant fish hooks are in an out-of-the-way position wherein they will not come into contact with the fingers.

A similar and related object is to provide a container of this sort wherein the lure, after having been removed and inspected, may readily be returned to the container and restored to its original position.

Another object of the invention is to provide a packaging and display container for lures in which the individual containers are provided with interlocking means so that two or more of the containers may be arranged in side-by-side attached relationship to form a row for compactness during shipping, for convenient display in selling, or for incorporation into a single unit for enclosure within a larger container such as a tackle box. In the first instance the containers are prevented during shipping from rubbing against each other and thereby damaging their finish or surface ornamentation. In the second instance, when on display, the containers are not susceptible to disarrangement by a prospective purchaser, while at the same time the individual lure displayed by a particular container may readily be removed and replaced without dislodging the container from its sequential position within the row. In the last instance, a number of the lure containers may be locked together to establish a compact and substantially rigid unit of the desired number of containers to accommodate large or small tackle boxes or to accommodate the arrangement of space within such boxes.

A still further object of the invention is to provide a fish lure container of the character briefly outlined above which is capable of interlocking engagement with adjacent containers for display or other purposes and which, when a number of such containers are so interlocked, the cover portions thereof are readily removable and replaceable on their respective containers without disturbing the respective positions of the containers in the array.

The provision of a fish lure container which is extremely simple in its construction; one which may be manufactured at a relatively low cost yet which is rugged and durable and consequently is not easily damaged; one which is attractive in its appearance and pleasing in its design; and one which is extremely convenient for holding the packaged lures when set in a tackle box, or the like, are further desirable features that have been borne in mind in the production and development of the present invention.

Other objects and advantages of the invention, not at this time enumerated, will become apparent as the following detailed description ensues.

In the accompanying three sheets of drawings, several embodiments of the invention have been shown. In these drawings:

Fig. 1 is a perspective view of a fish lure container constructed in accordance with the principles of the present invention and showing the cover therefor poised preparatory to assembly on the body portion of the container;

Fig. 2 is a longitudinal, sectional view taken substantially centrally through the assembled container;

Fig. 3 is a transverse sectional view through a number of the containers such as the container shown in Fig. 1, illustrating the latter arranged in interlocking relationship. In this view certain of the containers are shown as having fish lures packaged therein and certain of them are shown with their covers removed.

In all of the above-described views similar characters of reference are employed to designate similar parts throughout.

Figure 4:
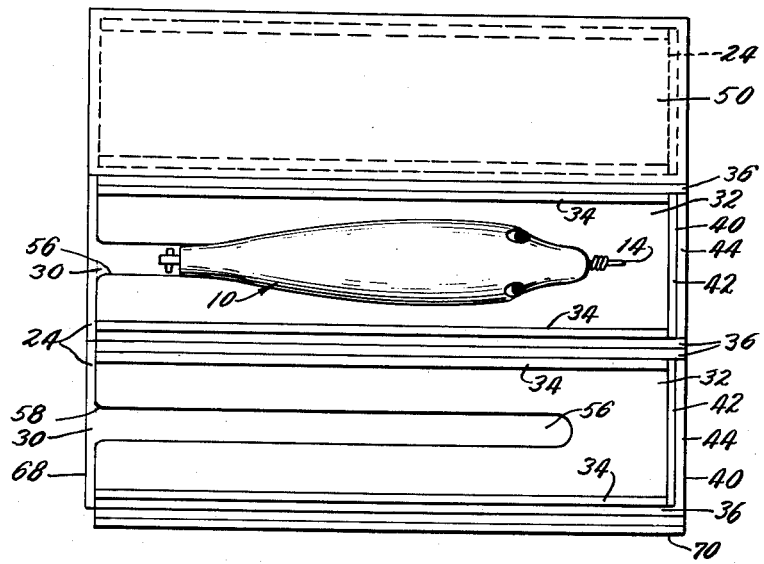
Fig. 4 is a plan view of a number of interlocked containers.

In the drawings there is shown by way of example a typical fish lure which may be packaged and displayed in any of the containers of the present invention. Such a lure appears in Figs. 2 and 3 in the form of a plug designated in its entirety at 10 and having a body 12 which is generally circular in cross-sectional configuration. An attachment eyelet 14 is mounted on the front end of the body 10. A rear three-pronged hook assembly 16 is suspended from an eyelet 18 at the extreme rear of the body 10, and forward and intermediate hook assemblies 20 and 22, respectively, are similarly suspended from eyelets 18 carried on the underneath side of the lure body in the forward and medial regions thereof, respectively. When the body 10 is held in horizontal position, the hook assemblies 16, 20 and 22 depend from the body 10 with their shank portions substantially vertical. The overall length of each hook assembly is such that the lower ends thereof lie approximately in the same plane.

Referring now to Figs. 1 to 4 inclusive wherein one preferred embodiment of a lure container has been illustrated, the container involves in its general organization a box-like structure 24, preferably of transparent plastic material, which is of elongated tubular design, rectangular in cross-section, and provided with side walls 26 and 28, a horizontal bottom wall 30 and an intermediate dividing partition or shelf 32. The side walls 28 above the dividing wall or shelf 32 are provided with inwardly offset portions 34 providing a pair of longitudinally extending ledge portions 36 on the outside of the container which are substantially coextensive with the respective side walls 26 and 28 and the function of which will be made clear presently. The container 24 is provided with an open front indicated at 38 and with an upstanding rear wall 40, having a thickened portion 42 above the dividing wall or shelf 32, and which is relieved in its upper regions to provide a narrow transversely extending ledge 44 which is substantially coextensive with the rear wall 40 and which assumes an elevation somewhat above the elevation of the longitudinally extending ledges 36.

The two longitudinally extending ledges 36 and the elevated transverse ledge 44 are provided for the purpose of supporting thereon the mating edges of a rectilinear cover 50 (Fig. 1) which is capable of being removably applied to the container body, all in a manner that will be made clear presently.

The dividing wall or shelf 32 divides the space existing within the container body into upper and lower compartments 52 and 24, respectively, the upper compartment being designed for reception therein of the lure body 10 and the lower compartment 54 being designed to enclose a major portion of the various hook assemblies 16, 20 and 22. An elongated, longitudinally extending slot 56 is formed centrally in the dividing wall or shelf 32 and is of sufficient width that the opposed edges thereof, may, in combination, serve as a cradle to support the lure bodies 10 therebetween with the hook assemblies 16, 20 and 22 depending into the lower compartment 54, and with the shank portions thereof extending through the slot 56, as clearly shown in Fig. 2. The extent of the slot 56 is sufficiently great as to accommodate the extreme forward positioning of the front hook assembly 20 on lures of the maximum length encountered, and the distance between the edges of the slot 56 is suffi-
ciently great that the lures will rest upon these edges with a considerable degree of stable equilibrium and tend to become centered with respect to the slot. If desired, the extreme front of, or entrance to, the slot 56 may be flared as at 58 to facilitate insertion of the lures into the container with the lure properly positioned and substantially centered in the lure compartment 52 and with the depending hooks 16, 20 and 22 extending into the hook compartment 54.

The cover member 50 is also preferably made of transparent plastic material and includes a top wall 59, a pair of side walls 60 and 62, a rear wall 64, and a front wall 66. The side walls 60 and 62 of the cover 50 are of equal height and the distance between the opposed inner faces of these side walls is equal to the distance between the planes of the outer surfaces of the inwardly offset portions 34 of the side walls 26 and 28 so that the cover may be centered against lateral shifting of the container body when the cover is in position. The side walls 60 and 62 are adapted to straddle the inwardly offset portions 34 and the lower longitudinal edges of the cover side walls are adapted to seat upon the ledge portions 36 associated with the container body. The height of the rear wall 64 of the cover 50 is less than the height of the side walls 60 and 62, its extent being such that when the cover is in position, the lower transverse edge of the rear wall 64 seats upon the ledge 44 with the rear wall 64 being nested within the relieved part of the thickened portion 42 of the rear wall 40 above the partition or shelf 32. The front wall 66 of the cover 50 depends below the lower edges of the side walls 60 and 62 and its extreme lower transverse edge is adapted to seat upon a ledge 68 provided by the extreme forward portion of the upper surface of the bottom wall 30, this portion of the wall being extended forwardly a slight distance beyond the forward edges of the container side walls 26 and 28.

From the above description it will be seen when the cover 50 is in position on the container body 44, as shown in Fig. 2, the front wall 66 thereof provides an effective closure for the lower hook compartment 54. The upper region of the front wall 66 of the cover, together with the horizontal top thereof, serves as a closure for the normally open lure compartment 52. The cover is centered in its position of closure on the container body 24 by means of the various parts of the container body over which it is telescopically received.

Means are provided whereby a series of the container bodies 24 may be arranged in side-by-side relationship in straight-line fashion to produce a row of the containers for display purposes with the opposing sides of adjacent containers interlocked with each other so that the entire series of containers becomes in effect a unitary structure which may be shifted from place to place. For this purpose the side wall 28 of each container 24 in the series is provided with a T-shaped rib or tongue 70 which is preferably coextensive throughout the entire longitudinal extent of the side wall. The side wall 38 of each container in the series is provided with a T-shaped slot 72 therein likewise substantially coextensive with the longitudinal extent of the side wall and positioned at the same general elevation as the T-shaped rib or tongue 70. The tongue 70 is in the form of an offset protuberance which projects outwardly beyond the confines of the container body proper while the groove 72 may be considered as being formed in a thickened portion 74 of the side wall 26. Actually, however, the elongated T-shaped groove 72 exists by virtue of an entrance slot 76 provided in the wall 26 together with a horizontally extending web 78 and a vertically extending web 80 cooperating with each other and with the wall 26 to make up the internal channel portion of the T-shaped groove.

In assembling the various containers of a series upon each other, as shown in Figs. 3 and 4, the T-shaped tongue 70 on a selected container body 24 may be aligned longitudinally with the T-shaped slot 72 on a similar container. The two containers may then be moved relative to each other in a longitudinal direction so that the tongue 70 of one container slides into the groove 72 of the other container until such time as the containers are in transverse alignment, after which additional containers may be assembled on either end of the series in a similar manner. With the containers thus assembled, the outer face of the side wall 28 of one container will abut against the outer surface of the side wall 26 of the next adjacent container so that no lost space exists between the containers, thus producing a compact unitary assembly in which the lures may be displayed, each in its individual container in side-by-side relationship for convenient inspection and comparison, assuming of course that the cover members 50 are removed, or that the covers are of transparent material.

When a series of containers 24 are thus assembled, the distance between adjacent offset portions 34 of the side walls 24 is slightly greater than twice the thickness of the cover side walls 60 and 62, so that when adjacent containers are covered, the combined thicknesses of the meeting cover side walls will be accommodated without binding. It will be seen that the individual covers 50 may be moved from their respective containers at will to display or to provide access to the various lures, and, when a particular lure has been selected for purchase from the display, the respective container within which it is housed may be slid longitudinally relative to the remaining containers in the series and thus disengaged therefrom, even though the selected container be in a medial position within the series. After its removal the existing void may be closed by simply moving the interlocked containers on opposite sides of the void together so as to substantially close the gap previously created by removal of a container, and then sliding one of the opposed disengaged containers from the series a sufficient distance that the tongue 70 or the groove 72 thereof as the case may be, clears its counterpart on the next adjacent container, after which accurate alignment of the tongue and groove may be made and the offset container again restored to its position in the series in interlocking engagement with the containers on opposite sides thereof.

The box-like structure 24 is capable of being formed in various ways and of various materials. If desired, the same may be of sectional design, made up of individual panels, struts or other structural members which cooperate with one another to give to the structure the desired shape. However, it is preferred that the structure be integrally formed of a suitable plastic material which may have either thermoplastic or thermosetting physical qualities. The body structure 24 is well adapted for forming from a plastic material by an injection molding process.

It is within the scope of the present invention to also construct the cover members 50 of transparent plastic material, as for example, Lucite, in order that the lures positioned within the containers may be viewed without removing the cover, thus discouraging indiscriminate handling of the lures prior to selection thereof.

In all forms of the invention, one of the principal advantages is the facility with which the lures can be mounted in and removed from the containers when carried in a tackle box or the like. Since the covers, at least, are preferably made of transparent material, the lures can be seen without removal of the covers, and in the form of the invention shown in Figs. 1–4 inclusive the containers are interlocked so that they can be mounted as a unit in a tackle box.

I claim:

1. A packaging and display container for a fish lure having an elongated body and one or more hooks depending from the underneath side thereof, said container including a box-like body of moulded plastic material having a bottom wall, vertical side walls, a vertical rear wall, and having an open front and top, the height of said rear wall being greater than the height of said side walls thus rendering the sides of the box-like body partially open, a horizontal partition wall extending between said side walls and dividing the box-like body into a lower open hook-receiving compartment and an open upper lure body-receiving compartment, there being an elongated slot formed in said partition wall, said partition wall constituting a shelf for supporting the lure body thereon with the underneath side thereof cradled between the opposed edges of the slot, the upper regions of said side walls being offset inwardly a slight distance to provide a pair of longitudinally extending horizontal ledge portions coextensive with the side walls, the upper regions of said end wall likewise being offset inwardly to provide a transversely extending horizontal ledge portion coextensive with the rear wall, and a transparent cover of moulded plastic material for said box-like body having a top wall, depending side walls, and depending front and rear walls, said front wall extending the full height of said vertical side walls of said container, said cover, when in position on said box-like body having the lower edges of its side walls supported on the longitudinally extending horizontal ledges and having the lower edge of its rear wall supported on the transversely extending horizontal ledge, said cover serving to close the open front, top and partially open side walls of the box body and to thus close the open compartments formed in the box-body by said dividing partition wall.

2. A packaging and display container for a single fish lure having an elongated body and one or more hooks depending from the underneath side thereof, said container including a box-like body of moulded plastic material having a bottom wall, vertical side walls, a vertical rear wall, and having an open front and top, a horizontal partition wall extending between said side walls and dividing the box-like body into a lower hook-receiving compartment and an upper lure body-receiving compartment for said single lure, there being an elongated slot formed in said partition wall, said partition wall constituting a shelf for supporting the lure body thereon with the underneath side thereof cradled between the opposed edges of the slot, the upper regions of said side walls and of said rear wall being offset inwardly to provide a pair of longitudinally extending horizontal ledges and a transversely extending horizontal ledge on the outer surfaces of said side walls and said rear wall respectively, of the box-like body, and a transparent cover of moulded plastic material for said box-like body having a top wall, depending side walls and depending front and rear walls, said cover, when in position on said box-like body, having the lower edges of its side walls supported on the longitudinally extending horizontal ledges, the lower edges of its rear wall supported on the transversely extending horizontal ledge, and the lower edge of its front wall supported on the bottom wall of the box-like structure.

3. A packaging and display container for a fish lure having an elongated body and one or more hooks depending from the underneath side thereof, said container including a box-like body of moulded plastic material having a bottom wall, vertical side walls, a vertical rear wall and having an open front and top, a horizontal partition wall extending between said side walls and dividing the box-like structure into a lower hook-receiving compartment and an upper lure body-receiving compartment, there being an opening in said partition wall through which the hooks are adapted to project when the lure body is in position within the upper compartment, the upper regions of said side walls and of said end wall being offset inwardly to provide a pair of longitudinally extending horizontal ledges and a transversely extending horizontal ledge on the outer sides of the box-like body, integral means providing an outwardly offset male interlock member on one of said side walls below the offset portion thereof, means providing an inwardly extending female interlock recess on the other side wall at substantially the horizontal level of the male interlock member, said interlock member and recess being complementary in configuration whereby a series of the box-like bodies may be arranged in a transverse row in interlocking engagement, and a transparent cover of moulded plastic material for said box-like member having a top wall, depending side and depending front and rear walls, said front wall extending the full height of said vertical side walls of said container, said cover, when in position on said box-like body, having the lower edges of its side walls supported on the longitudinally extending horizontal ledges and the lower edge of its rear wall supported on the transversely extending horizontal ledge, said cover serving to close the open compartments formed in the box-body by said dividing partition wall.

References Cited in the file of this patent

UNITED STATES PATENTS

| | | |
|---|---|---|
| 224,486 | Spruce | Feb. 10, 1880 |
| 1,030,758 | Alder | June 25, 1912 |
| 1,883,134 | Walker et al. | Oct. 18, 1932 |
| 1,897,672 | Neuman | Feb. 14, 1933 |
| 1,951,831 | Lewis | Mar. 20, 1934 |
| 2,097,185 | Hall | Oct. 26, 1937 |
| 2,364,807 | Nelson | Dec. 12, 1944 |
| 2,511,949 | Simon | June 20, 1950 |
| 2,605,892 | Waber et al. | Aug. 5, 1952 |

FOREIGN PATENTS

| | | |
|---|---|---|
| 288,754 | Germany | Nov. 16, 1915 |
| 584,200 | France | Nov. 14, 1924 |